US005844692A

United States Patent [19]

Jeon

[11] Patent Number: 5,844,692
[45] Date of Patent: Dec. 1, 1998

[54] METHOD FOR DISPLAYING JOURNAL DATA ON A DISPLAY WINDOW OF A FACSIMILE SYSTEM

[75] Inventor: Seon-A Jeon, Suwon, Rep. of Korea

[73] Assignee: SamSung Electronics Co., Ltd., Suwon, Rep. of Korea

[21] Appl. No.: 685,904

[22] Filed: Jul. 22, 1996

[30] Foreign Application Priority Data

Jul. 21, 1995 [KR] Rep. of Korea .................. 1995/21640

[51] Int. Cl.$^6$ ........................................................ H04N 1/32
[52] U.S. Cl. ........................ 358/442; 345/127; 345/145; 345/146
[58] Field of Search .................................... 345/145, 123, 345/124, 125, 127, 146, 157, 117; 358/442, 479; 395/100

[56] References Cited

U.S. PATENT DOCUMENTS

| | | | |
|---|---|---|---|
| 5,170,255 | 12/1992 | Marsh et al. ............................. | 358/468 |
| 5,239,386 | 8/1993 | Ishiwatari ............................... | 358/440 |
| 5,321,802 | 6/1994 | Furuya et al. .......................... | 395/146 |
| 5,384,830 | 1/1995 | Ide ........................................... | 379/67 |
| 5,392,131 | 2/1995 | Umeno ..................................... | 358/403 |
| 5,438,433 | 8/1995 | Reifman et al. ........................ | 358/468 |
| 5,448,375 | 9/1995 | Cooper et al. .......................... | 358/403 |
| 5,487,106 | 1/1996 | Kenmochi ............................... | 379/100 |
| 5,530,455 | 6/1996 | Gillick .................................... | 345/163 |
| 5,532,946 | 7/1996 | Phipps et al. ..................... | 364/710.14 |
| 5,563,996 | 10/1996 | Tchao ...................................... | 395/144 |
| 5,602,963 | 2/1997 | Bissonnette ........................... | 395/2.84 |

*Primary Examiner*—Thomas D. Lee
*Assistant Examiner*—Jerome Grant, II
*Attorney, Agent, or Firm*—Robert E. Bushnell, Esq.

[57] ABSTRACT

A method for displaying journal data on a display window in a facsimile system in which journal data stored in a memory of the facsimile system is initially checked in response to an input of a journal data display key. When the journal data is stored in the memory, a message indicating that the facsimile system is in a journal data display mode is displayed on a display window. A predetermined item of journal data in a full information display mode is then sequentially displayed on the display window in response to an input of a scroll key in one of a backward and forward direction. Alternatively, the journal data in a short information display mode is fully displayed on the display window in response to an input of the scroll key in one of an upward and downward direction. Optionally, the journal data stored in the memory may also be printed out in response to a print key.

20 Claims, 5 Drawing Sheets

| MESSAGE CONFIRMATION | CPR-15 16:29 FRI |
| --- | --- |
| | FAX NUMBER : |
| | 555-1212 NAME: SAMSUNG |
| FAX NUMBER: 1233346555 — COUNTERPART NUMBER | |
| PAGE :20 — TOTAL PAGE | |
| ELAPSED TIME: 00'30' — TRANSMITTANCE ELAPSED TIME | |
| MODE : G3 STD — TRANSMISSION MODE | |
| RESULTS : O.K — TRANSMITTANCE RESULT | |

Fig. 7

METHOD FOR DISPLAYING JOURNAL DATA ON A DISPLAY WINDOW OF A FACSIMILE SYSTEM

CROSS-REFERENCE TO RELATED APPLICATIONS

This application makes reference to, incorporates the same herein, and claims all benefits accruing under 35 U.S.C. §119 from an application for *Method For Displaying Journal Data On A Display Window Of A Facsimile System* earlier filed in the Korean Industrial Property Office on the 21st of Jul. 1995, and there duly assigned Serial No. 21640/1995.

BACKGROUND OF THE INVENTION

1. Technical Field

The present invention relates to an improved facsimile system, and more particularly to facsimile telecommunication units and process providng a variable visual display of journal data through a display window of a facsimile system.

2. Background Art

Conventional facsimile systems available in the market today contain a long list of sophisticated options for the convenience of users. For facsimile systems used primarily in an office environment, one of those convenient features is to record journal data relating to all documents that had been sent or received by the facsimile system in a document memory list of a memory so that the user must print the document memory list on papers in order to access to journal data stored in the memory. Typically, the document memory list contains the transaction or communication number, how each document was stored, the connection telephone number, the number of pages of the document, the date and time each document was stored in the fax memory and when it will be sent, the sender name and any errors that occurred when sending the document.

In recent years however, as facsimile systems have become increasingly accessible for use by a multitude of people with different calling functions, it is now desirable that the journal information relating to the documents that had been sent or received by the facsimile system be displayed on a display window of the facsimile system rather than on the paper. The desire to display such journal information on a display window is further enhanced when the facsimile system is not being used for security purposes. There is a number of known information display techniques recently available for facsimile systems. For example, in U.S. Pat. No. 5,321,802 for *Information Processing Apparatus*, Furuya et al. endeavor to provide an "on-screen" facsimile system having a menu screen for allowing the user to display a list of fax received documents. The content of a selected document can then be displayed on the screen and scroll keys are provided to allow the user to conveniently edit the document. U.S. Pat. No. 5,438,433 for *System And method For Facsimile Cover Page Storage And Use* issued to Reifman et al. discloses an intelligent facsimile system in which the user is allowed to provide a visual display of a list of report options on a touch-sensitive screen. Scroll keys are also provided to allow the user to scroll through the menu list for selection. The information display techniques of Furuya et al. '802 and Reifman et al. '433 are, however, complex. In U.S. Pat. No. 5,392,131 for *Facsimile Machine Having Function Of Retrieving Stored Documents Waiting For Transmission*, Umeno discloses a facsimile system having a journal data table for storing therein journal data relating to a plurality of documents including file number, destination telephone number, acceptance time and document sheet number. A retrieval key is provided to allow the user to retrieve journal data of a document based on its file number for a visual display on a standard display screen. Once the journal data of a particular file number is displayed on the display screen, the user can scroll backward and forward to retrieve the journal data of the previous or next file number for the eventual transmission of the contents of a retrieved document. According to Umeno '131, the contents of the retrieved document may also be displayed if a display screen of the facsimile system is sufficiently enlarged to accommodate a corresponding predetermined number of lines of the retrieved document. This requirement, as I have observed, is not cost effective, incompatible and is particularly undesirable when an operating panel of virtually all standard facsimile systems available in the market today is built to contain a liquid crystal display arranged in a two-lines display window. Moreover, the journal data table of Umeno '131 is intended to store only document data to be transmitted during the operation of the redialing or time specific transmission.

SUMMARY OF THE INVENTION

Accordingly, it is therefore an object of the present invention to provide an improved facsimile telecommunication system.

It is another object to provide a facsimile telecommunication system allowing the user to retrieve journal data for a visual display on a standard display screen in one of a full information display mode and a short information display mode.

It is still another object to provide a process for effectively displaying journal data on a standard display window of a facsimile system in either a full information display mode and a short information display mode.

These and other objects of the present invention can be achieved with a process for displaying journal data on a display window in a facsimile system by checking whether the journal data is stored in a memory of the facsimile system, in response to an input of a journal data display key; displaying a message indicating that the facsimile system is in a journal data display mode, when said journal data is stored in the memory; sequentially displaying, on the display window, a predetermined item of the journal data in a full information display mode in response to an input of a scroll key in one of a backward and forward direction; and displaying, on the display window, the journal data in a short information display mode in response to an input of the scroll key in one of an upward and downward direction.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
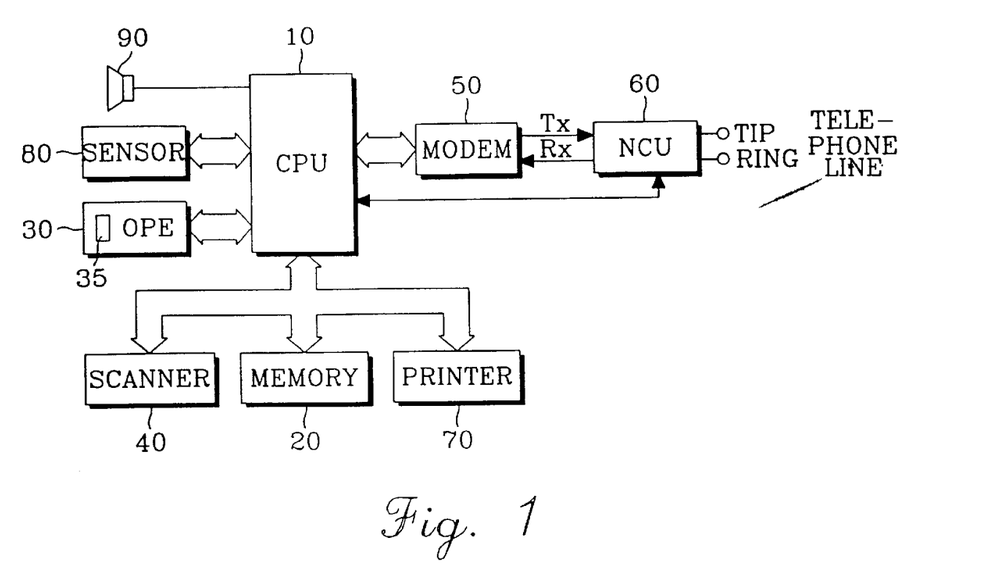
FIG. 1 illustrates a facsimile system constructed according to the principles of the present invention.

Referring now to the drawings and particularly to FIG. 1, which illustrates a facsimile system constructed according to the principles of the invention. The facsimile system includes a central processing unit (CPU) 10 for controlling operations of the facsimile system, a memory 20, an operational panel OPE 30 containing a display window 35 arranged by a two-lines liquid crystal display, a scanner 40, a modem 60, a network control unit NCU 60, a printer 70, a sensor 80 and a telephone (not shown).

The memory 20 includes a program memory such as a ROM (not shown) which stores programs for the CPU 10 to control the general operation of the facsimile system for transmission or reception of image data from another communication system, and a data memory such as a RAM (not shown) which temporarily stores a variety of items of information. The data memory includes a journal data map for storing communication history including transmittance and reception results of the facsimile system. The operational panel (OPE) 30 includes a key input unit and a display window 35. The key input unit of the operational panel 30 comprises numeric keys for generating key data to the CPU 10 to dial a telephone number of a counterpart communication system. The window display 35 of the operational panel 30 displays data indicating various modes of operations of the facsimile system. The sensor 80 senses whether a document is input into the facsimile system, or whether copy paper is stored and available for use, and generates an indicative signal to the CPU 10. The scanner 40 transports and scans an image of the input document and then generates image data corresponding to the scanned image. The image data output from the scanner 40 is then processed for either transmission via a telephone line or copy during the copy mode under control of the CPU 10. The printer 70 prints the processed image data received from the NCU 60 on a printable medium such as individual cut sheets of papers during the reception mode and the copy mode under the control of the CPU 10. The modem 70 modulates the processed image data output from the CPU 10 into a modulated image signal for transmission, and duplicates the image signal input to the CPU 10 during the reception mode under the control of the CPU 10. The network control unit (NCU) 60 is connected with a tip and ring terminals of a telephone line to form transmission and reception paths for the modem 50 under the control of the CPU 10.

Figure 2:
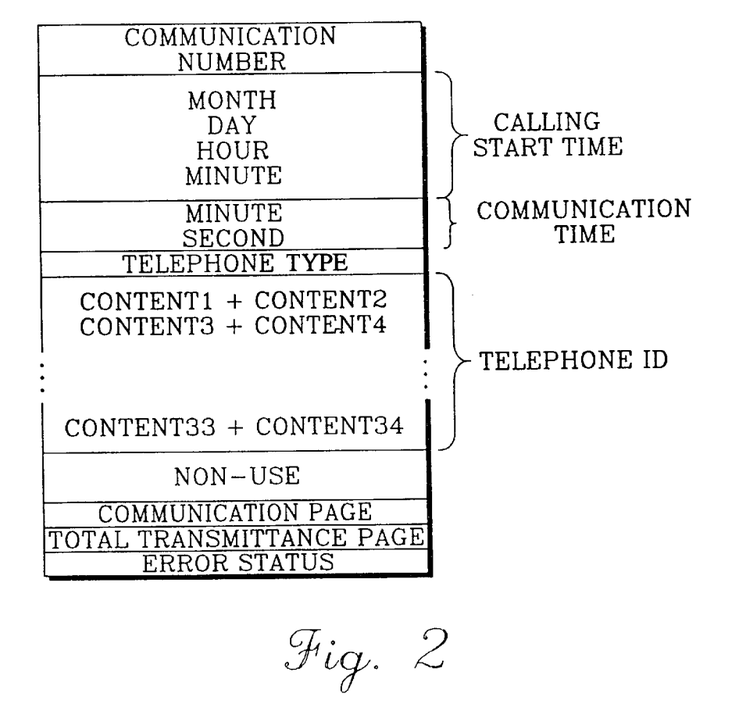
FIG. 2 illustrates a construction of a journal data map of a memory for storing communication history including transmittance and reception results of the facsimile system of FIG. 1.

FIG. 2 illustrates a journal data map contained in the memory 20 for storing communication history or journal data relating to a communication number, a communication starting time, communication time, a telephone type, a telephone identifier (ID), a communication page, a total transmittance page and an error status of a document.

Figure 3:
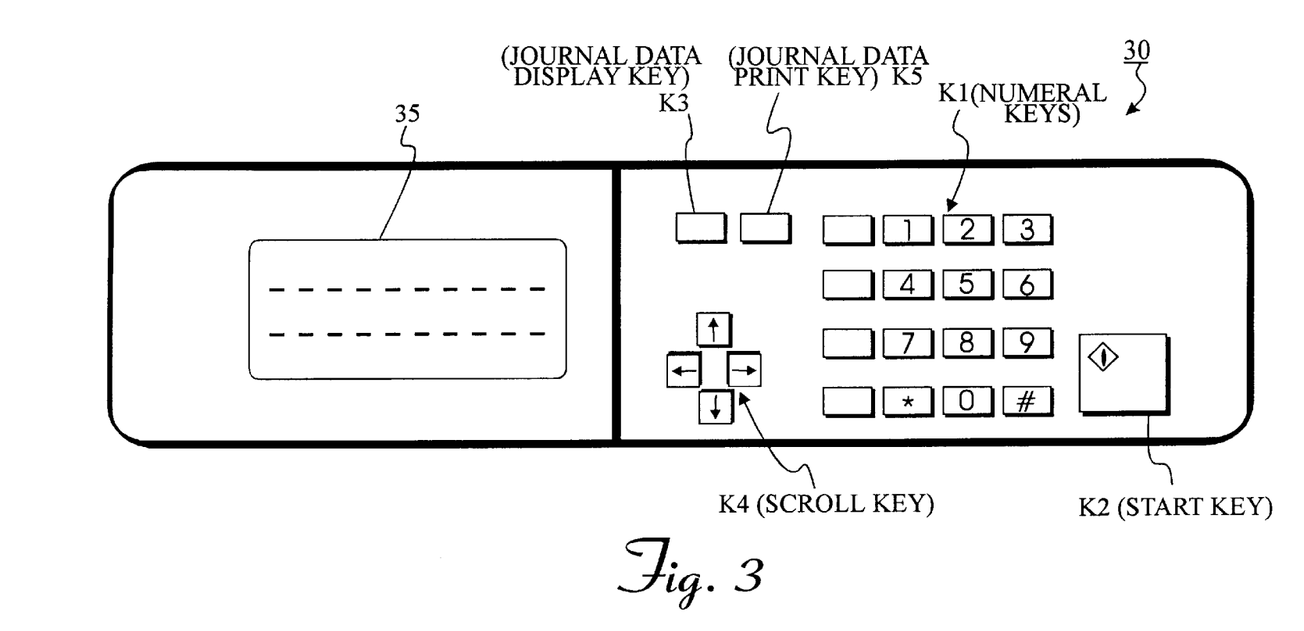
FIG. 3 illustrates a structure of an operating panel including a display window of the facsimile system of FIG. 1.
Figure 4:
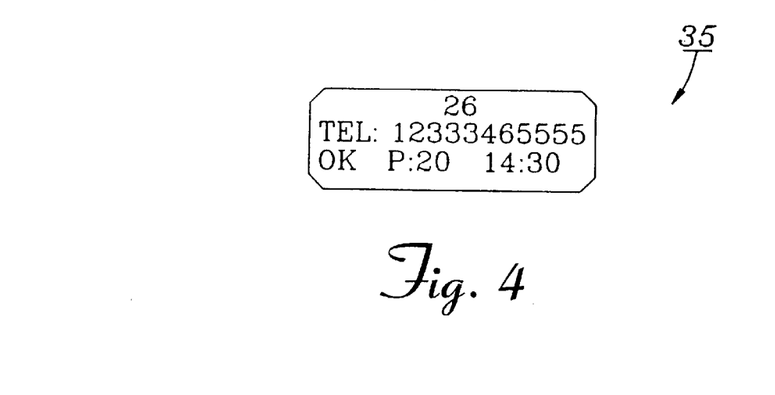
FIG. 4 illustrates a display of journal data on a display window of the facsimile system of FIG. 1.

Referring now to FIG. 3 which illustrates a structure of the operating panel (OPE) 30 of the facsimile system constructed according to the principles of the present invention. The OPE 30 includes an alpha numeral keys K1 for allowing the user to initial communication with another communication system and to control operation of the facsimile system, a start key K2 for allowing the user to start a transmission, a journal data display key K3 for allowing the user to retrieve the journal data stored in the memory 20 for a visual display on a display window 35 arranged by a standard two-lines liquid crystal display (LCD), and scroll keys K4 consisting of an up shift key, a down shift key, a right shift key and a left shift key for allowing the user to scroll among the journal data stored in the journal data map of memory 20 as displayed on the display window 35 in either a full information display mode or a short information display mode. In addition, a journal data print key is also provided to allow the user to optionally print the journal data stored in the journal data memory map of memory 20 in the event if the user does not want to view the journal data on a display window 35. When the journal data display key K3 is initially pressed by the user, a message indicating that a journal data display mode is displayed on the display window 35 of the OPE 30. Once the facsimile system is in arousal data display mode, the journal data contained in the memory 20 is retrieved and displayed on the display window 35. The journal data of the last document typically appears in a short information display mode as shown in FIG. 4 including a file number, a destination telephone number, a transmittance result, page number and communication start time. As shown in FIG. 4, the file number is "26"; the destination telephone number is "123334465555"; the total page number is "P:20"; the communication start time is "14:30" and the transmittance result is "OK".

Figure 5:
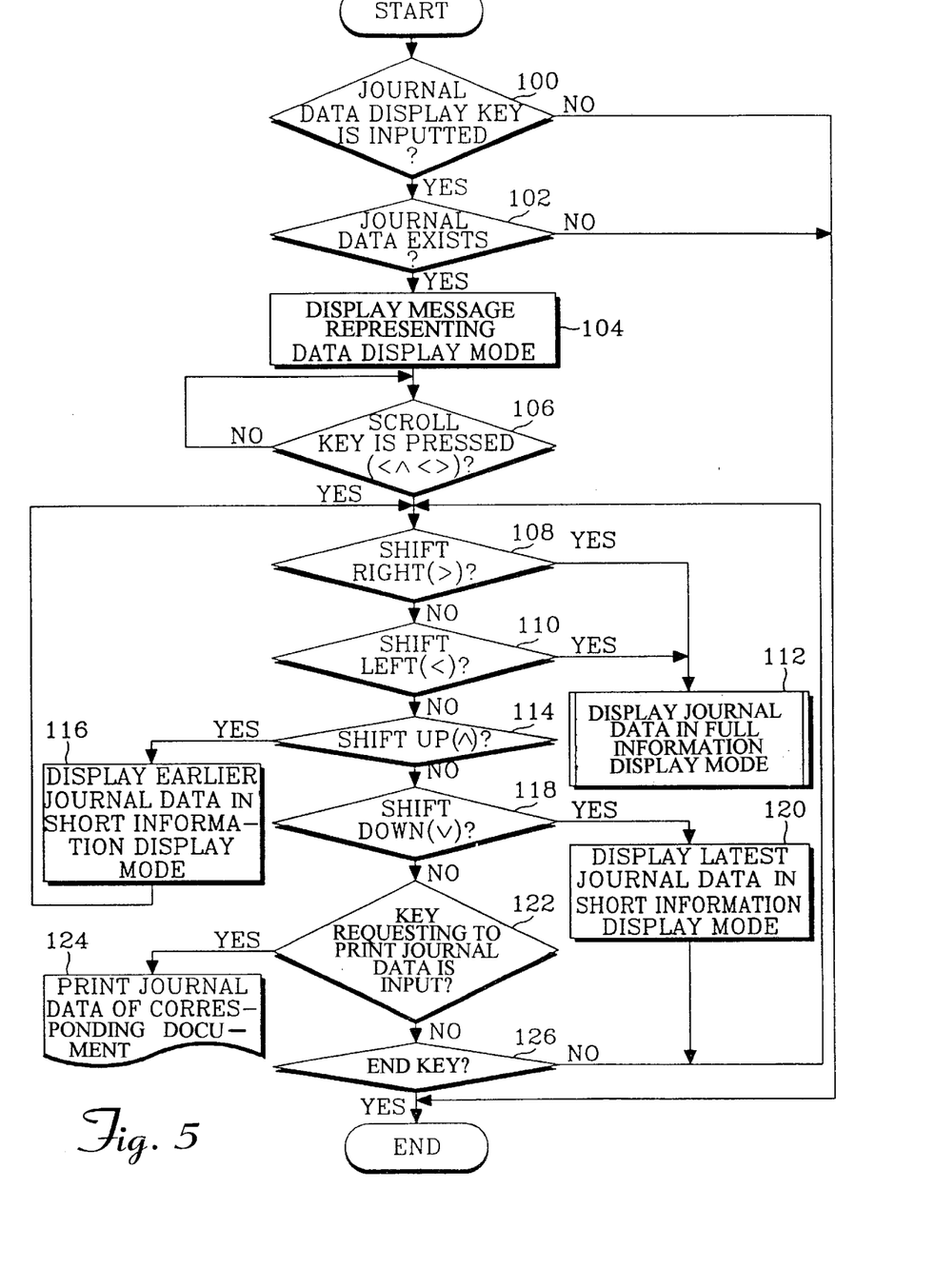
FIG. 5 illustrates a process of displaying journal data on a display window of the facsimile system in a full information display mode and a short information display mode according to the principles of the present invention.

Turning now to FIG. 5 which illustrates a process of displaying journal data on a display window 35 of the OPE 30 according to the principles of the present invention. The journal data as contemplated by the present invention is a transmittance and reception result report which can be displayed on a display window 35 of the OPE 30 in two different modes: a short information display mode as shown in Table 1, and a full information display mode as shown in Table 2, in response to the user's selection using scroll keys K4.

TABLE 1

| Telephone No. | Result | Page | Start Time |
|---|---|---|---|
| 12333465555 | OK(ERROR) | 20 | 14:30 |

TABLE 2

| Telephone No. | Start Time | Elapsed Time | Page | Mode | Result |
|---|---|---|---|---|---|
| 12333465555 | 09-07 14:30 | 00:30 | 20 | G3 | OK |

As shown in Table 1, the journal data as stored in the journal data map of memory 20 to be displayed on a display window 35 of the OPE 30 in a short information display mode includes the counterpart or destination telephone number, the transmittance result, the total page and the start time. In a full information display mode as shown in Table 2, on the other hand, the journal data includes the counterpart number, the start time, the transmittance elapsed time, the total page, the transmittance mode and the transmittance result.

The display window 35 of the OPE 30 as described is arranged in two lines of a liquid crystal display (LCD). The journal data retrieved from the journal data map of memory 20, whether in a short information display mode or a full information display mode, is displayed on the two lines of the display window 35. When the journal data is first retrieved and displayed on the display screen 35 of the OPE 30 in response to the depression of the journal data display key K3 as shown in FIG. 3, scroll keys K4 are used to allow the user to scroll the screen upward and downward, in a short information display mode, to reference a preceding or succeeding file number and retrieve the journal data corresponding to the newly referenced file number for a visual display on the display window 35 of the OPE 30. When the user scrolls the screen forward and backward, however, the journal data is automatically displayed in a full information display mode.

Referring back to FIG. 5 which illustrates a process of displaying journal data in a short information display mode and a full information display mode. When a journal data display key K3 is pressed by the user, the CPU 10 recognizes the selected key at step 100 and checks whether there exists journal data stored in the journal data map of memory 20. If there is no journal data stored in the journal data map of memory 20 at step 102, no journal data can be displayed on the display window 35 of the OPE 30. If, on the other hand, there is journal data stored in the journal data map of memory 20, the CPU 10 displays a message indicating that the facsimile system is in a journal data display mode on the display window 35 of the OPE 30 at step 104. The message indicating that the facsimile system is in a journal data display mode can be in a form of, for example, "DISPLAY LATEST JOURNAL DATA".

When the message indicating at the facsimile system is in a journal data display mode at step 104 is displayed on the display window 35 of the OPE 30, the CPU 10 determines whether a scroll key K4 is pressed by the user at step 106 to display the journal data stored in the journal data map of memory 20 in either a full information display mode or a short information display mode. When a scroll key K4 as pressed by the user represents either a right or a left shift key at steps 108 and 110, the CPU 10 recognizes the corresponding key data, retrieves the journal data stored in the journal data map of memory 20 and displays such journal data on the display window 35 of OPE 30 in a full information display mode at step 112. If, on the other hand, the scroll key K4 as pressed by the user represents either an up or down shift key at steps 114 and 118, the CPU 10 recognizes the corresponding key data and prepares to display the journal data in a short information display mode.

For example, when the key data corresponds to the up shift key of the scroll keys K4 at step 114, earlier journal data of a preceeding document stored in the journal data map of memory 20 is displayed on the display window 35 of the OPE 30 in a short information display mode at step 116. An example of the journal data being displayed on a display window 35 of the OPE 30 in a short information display mode is shown in FIG. 4 in which the destination telephone number TEL: 12346565566 is displayed on an upper line of the display window 35, and the transmittance result OK, the total page P:20, the transmittance start time 13:34 are displayed on a lower line of the display window 35. After the earlier journal data is displayed on the display window 35 in a short information display mode at step 116, the CPU 10 returns to step 108 to continuously perform operations corresponding to the input of the right shift key, the left shift key, the up shift key and the down shift key of the scroll keys K3.

If the key data input does not correspond to the up shift key of the scroll keys K4 at step 114, the CPU 10 checks whether the key data input corresponds to the down shift key of the scroll keys K4 at step 118. If the scroll key represents the down shift key at step 118, the CPU 10 recognizes the corresponding key data, retrieves the latest or succeeding journal data stored in the journal data map of memory 20 and displays such latest journal data on the display window 35 of OPE 30 in a short information display mode at step 120. Again, after the latest journal data is displayed on the display window 35 in a short information display mode at step 118, the CPU 10 returns to step 108 to continuously perform operations corresponding to the input of the right shift key, the left shift key, the up shift key and the down shift key of the scroll keys K3.

Figure 6:
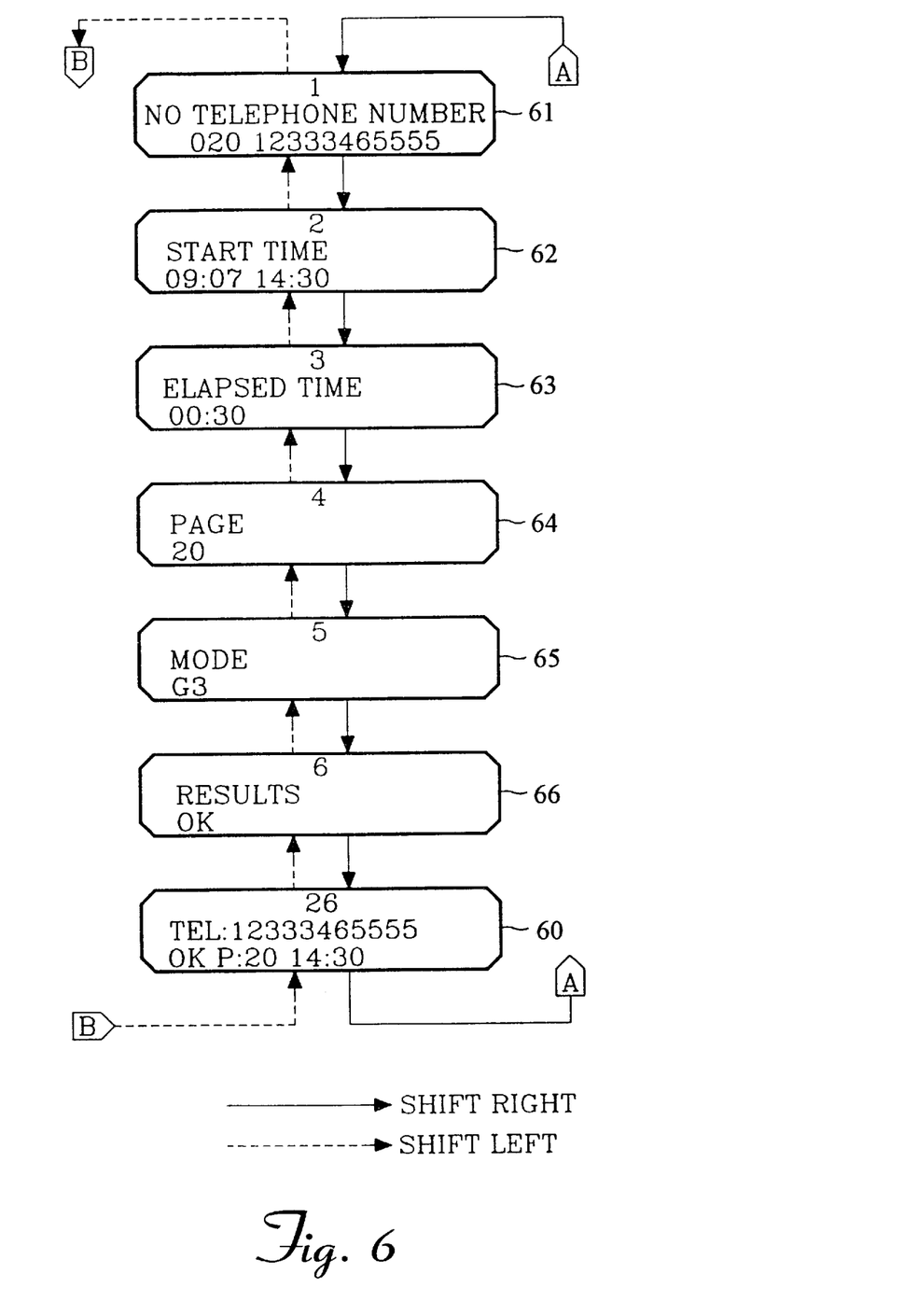
FIG. 6 illustrates a display of journal data on a display window in a full information display mode and a short information display mode according to the principles of the present invention.
Figure 7:
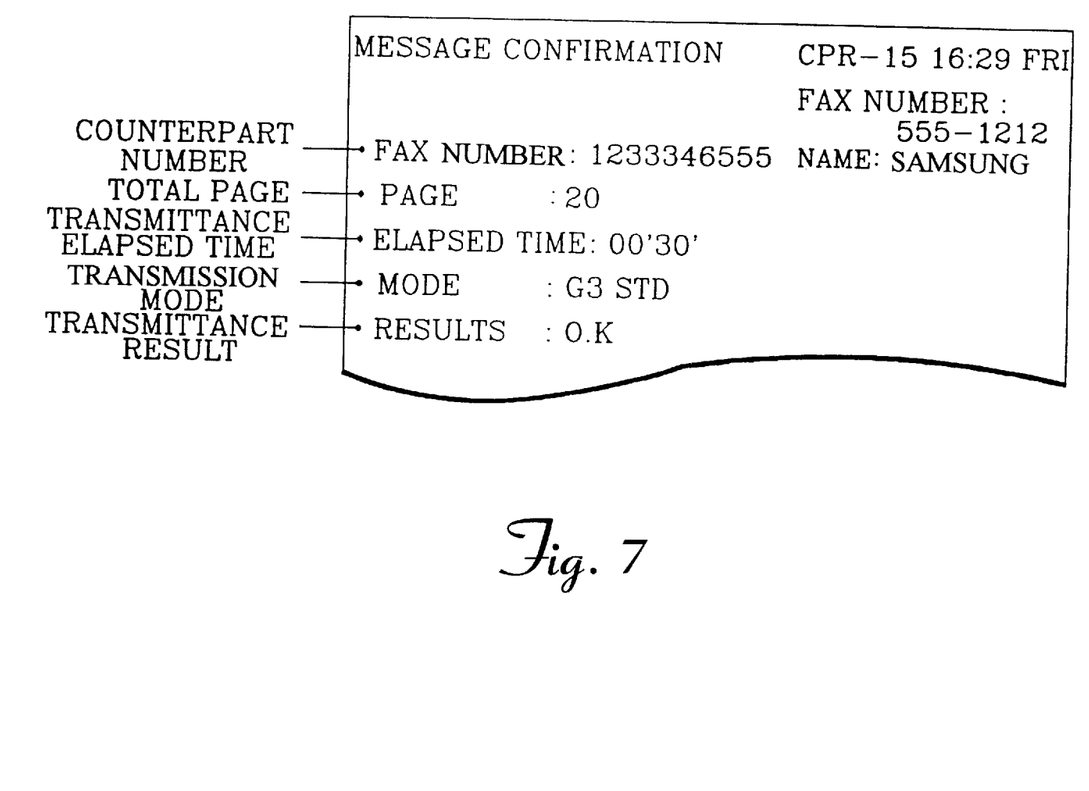
FIG. 7 illustrates a transmittance result report printed as an option by the facsimile system according to the present invention.

Referring now to FIG. 6 which illustrates a display of journal data on a display window 35 of the OPE 30 in a full information display mode. The journal data displayed on the display window 35 in a full information display mode is the same journal data shown in Table 2 below. The item corresponding to a range of the display window 35 is displayed one-by-one on the display window 35 according to the insertion of the right or left shift key.

TABLE 2

| Telephone No. | Start Time | Elapsed Time | Page | Mode | Result |
| --- | --- | --- | --- | --- | --- |
| 12333465555 | 09-07 14:30 | 00:30 | 20 | G3 | OK |

The item displayed on the display window 35 will be in detail described with reference to Table 2 and FIG. 6. When the scroll key K4 corresponding to the right shift key is pressed by the user, the journal data is displayed in a sequence of the telephone number as shown in step 61,—the transmittance start number as shown in step 62—the transmittance elapsed time as shown in step 63—the total page as shown in step 64—the transmittance mode as shown in step 65—the transmittance result as shown in step 66. In other words, the items of the Table 2 are one by one displayed from the left to the right.

At this time, if the right shift key of scroll keys K4 is pressed one more time in the state of displaying journal data corresponding to the far right item (that is, the transmittance result at step 66) in a full information display mode, journal data of a short information display mode 26 is, at one time, displayed on the display window 35 as shown in step 60. If, on the other hand, the left shift key of scroll keys K4 is pressed, the item corresponding to an opposite direction to the shift right is sequentially displayed on the display window 35. And, if the user presses either the up shift or down shift key of scroll keys K4 at any time while the journal data is being displayed in a full information display mode, the earlier journal data or the next journal data is automatically displayed on the display window 35 in a short information display mode in response to the depression of the up shift or down shift key.

Referring back to FIG. 5, if the key data corresponding to the shift right, the shift left, the shift up and the shift down is not received, the CPU 10 checks whether the key data corresponding to a journal data print key K5 is input by the user requesting a print out of the journal data at step 122. At this time, if key data corresponding to the journal data print key K5 requesting a print out of the journal data is input, the journal data of the corresponding item is printed through the printer 70 at step 124. However, if the journal data print key is not input by the user at step 122, the CPU 10 determines whether key data corresponding to an end key is input at step 126. At this time, if key data corresponding to the end key is input at step 126, the CPU 10 terminates the journal data display program. If, on the other hand, the end key is not input by the user at step 126, the CPU 10 returns to step 108 to continuously perform operations in response to the depression of the scroll keys K4.

As described above, the present invention advantageously provides a visual display of journal data stored in a journal data map of an internal memory of a facsimile system on a display window of an operating panel in either a short information display mode or a full information display mode. The user can scroll the screen using scroll keys in both the short information display mode and the full information display mode. In addition, the user has the option of printing out the journal data if he or she so desires.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for displaying journal data on a display window in a facsimile system, comprising the steps of:

checking whether said journal data is stored in a memory of the facsimile system, in response to an input of a journal data display key;

displaying a message indicating that the facsimile system is in a journal data display mode on said display window, when said journal data is stored in said memory;

sequentially displaying, on said display window, a predetermined item of said journal data in a full information display mode in response to an input of a scroll key in one of a backward and a forward direction;

displaying, on said display window, said journal data in a short information display mode in response to an input of said scroll key in one of an upward and a downward direction;

when said scroll key is pressed exhaustively in one of said backward direction and said forward direction while said journal data is being displayed on said display window in said full information display mode, automatically displaying, on said display window, said journal data in said short information display mode; and alternatively, when said scroll key is pressed in one of said upward direction and said downward direction while said journal data is being displayed on said display window in said full information display mode, automatically displaying said journal data in said short information display mode.

2. The method of claim 1, further comprised of said journal data, in said full information display mode, including a destination telephone number, a communication start time, a transmittance elapsed time, a total page number, a transmission mode and a transmittance result, and each item of which is displayed in a sequence on said display window in response to the input of said scroll key in one of said backward and forward direction.

3. The method of claim 1, further comprised of said journal data, in said short information display mode, including a destination telephone number, a transmittance result, a total page number and a communication start time, all items of which are displayed simultaneously on said display window in response to the input of said scroll key in one of said upward and downward direction.

4. The method of claim 1, further comprised of said step of displaying said journal data in said short information display mode comprising the step of:

displaying preceding journal data stored in said memory in said short information display mode, when said scroll key is pressed in said upward direction; and alternatively, displaying succeeding journal data stored in said memory in said short information display mode, when said scroll key is pressed in said downward direction.

5. The method of claim 1, further comprised of said display window comprising a two-lines of liquid crystal display.

6. The method of claim 1, further printing out said journal data stored in said memory in response to an input of a print key.

7. A method for displaying journal data on a display window of a facsimile system, comprising the steps of:

checking whether said journal data is stored in an internal memory of said facsimile system in response to an input of a journal data display key;

displaying a message indicating that the facsimile system is in a journal data display mode on said display window, when said journal data is stored in said memory;

sequentially displaying, on said display window, a predetermined item of said journal data corresponding to a destination telephone number, a start time, a transmittance elapsed time, a total page number, a transmission mode and a transmittance result in a full information display mode in response to an input of a scroll key in one of a backward and forward direction;

displaying, on said display window, said journal data corresponding to a destination telephone number, a transmittance result, a total page number and a start time in a short information display mode in response to an input of said scroll key in one of an upward and downward direction;

when said scroll key is pressed exhaustively in said forward direction while said journal data is being displayed on said display window in said full information display mode, automatically displaying, on said display window, said journal data in said short information display mode;

alternatively, when said scroll key is pressed in one of said upward direction and said downward direction while said journal data is being displayed on said display window in said full information display mode, automatically displaying said journal data in said short information display mode; and printing the corresponding item of said journal data in response to an input of a journal data print key.

8. The method of claim 7, further comprised of said destination telephone number of said journal data in said short information display mode is positioned on an upper line of said display window, and said transmittance result, said total page number and said start time of said journal data are positioned in a lower line of said display window in said short information display mode.

9. The method of claim 7, further comprised of said step of displaying said journal data corresponding to said short information display mode comprising the step of displaying preceding journal data stored in said internal memory in said short information display mode, when said scroll key is pressed in said upward direction; and alternatively, displaying succeeding journal data stored in said internal memory in said short information display mode, when said scroll key is pressed in said downward direction.

10. A facsimile system, comprising:

a memory for storing therein journal data representing a communication history of said facsimile system;

an operational panel including a display window, a journal data display key for allowing a user to retrieve the journal data stored in said memory for a visual display on said display window, a scroll key for allowing the user to scroll among the journal data stored in said memory while the journal data is being displayed on said display window in one of a full information display mode and a short information display mode, and a journal data print key for allowing the user to optionally print the journal data stored in said memory; and controller means for controlling a visual display of the journal data on said display window by:

determining whether said journal data is stored in said memory, when said journal data display key is pressed by the user;

displaying a message indicating that the facsimile system is in a journal data display mode on said display window, when said journal data is determined as being stored in said memory;

sequentially displaying, on said display window, each predetermined item of said journal data in a full information display mode, when said scroll key as pressed by the user is in one of a backward and a forward direction; and displaying, on said display window, said journal data in a short information display mode, when said scroll key as pressed by the user is in one of an upward and a downward direction;

when said scroll key is pressed exhaustively in said forward direction while said journal data is being displayed on said display window in said full information display mode, automatically displaying said journal data, on said display window, in said short information display mode; and alternatively, when said scroll key is pressed in one of said upward direction and said downward direction while said journal data is being displayed on said display window in said full information display mode, automatically displaying said journal data, on said display window, in said short information display mode.

11. The facsimile system of claim 10, further comprised of said journal data, in said full information display mode, including a destination telephone number, a communication start time, a transmittance elapsed time, a total page number, a transmission mode and a transmittance result, all of which are sequentially displayed on said display window when said scroll key is pressed by the user in one of said backward and forward direction.

12. The facsimile system of claim 10, further comprised of said journal data, in said short information display mode, including a destination telephone number, a transmittance result, a total page number and a communication start time, all items of which are displayed simultaneously on said display window when said scroll key is pressed by the user in one of said upward and downward direction.

13. The facsimile system of claim 10, further comprised of said controller means enabling printing of the corresponding item of said journal data in response to an input of a journal data print key.

14. The facsimile system of claim 10, further comprised of said controller means displaying said journal data corresponding to said full information display mode by:

displaying preceding journal data stored in said memory in said short information display mode, when said scroll key is pressed by the user in said upward direction; and alternatively, displaying succeeding journal data stored in said memory in said short information display mode, when said scroll key is pressed by the user in said downward direction.

15. The facsimile system of claim 10, further comprising printing means for printing said journal data stored in said memory in response to input of said journal data print key from said operational panel.

16. A method for displaying journal data on a display window in a facsimile system, comprising the steps of:

checking whether said journal data reflecting a communication history of said facsimile system is stored in an internal memory of said facsimile system, in response to an input of a journal data display key;

displaying a message indicating that the facsimile system is in a journal data display mode on said display window, when said journal data is stored in said internal memory;

when a scroll key is depressed in one of a first symmetrically opposite directions, sequentially displaying, on said display window, each item of said journal data in a full display format;

when said scroll key is depressed in one of a second symmetrically opposite directions perpendicular to said first symmetrically opposite directions, displaying, on said display window, said journal data in an abbreviated display format;

when said scroll key is depressed exhaustively in one of said first symmetrically opposite directions while said journal data is being displayed on said display window in said full display format, displaying said journal data in said short display format; and alternatively, when said scroll key is depressed in one of said second symmetrically opposite directions while said journal data is being displayed on said display window in said full display format, displaying said journal data in said short display format.

17. The method of claim 16, further comprised of said journal data, in said full display format, including a destination telephone number, a communication start time, a transmittance elapsed time, a total page number, a transmission mode and a transmittance result, and each item of which is displayed in a sequence on said display window in response to the input of said scroll key in one of said first symmetrically opposite directions.

18. The method of claim 16, further comprised of said journal data, in said short display format, including a destination telephone number, a transmittance result, a total page number and a communication start time, all items of which are displayed simultaneously on said display window in response to the input of said scroll key in one of said second symmetrically opposite directions.

19. The method of claim 16, further comprised of said display window comprising a two-lines of liquid crystal display.

20. The method of claim 16, further printing out said journal data stored in said internal memory in response to an input of a print key.

* * * * *